DATA CONVERSION FOR COUNTER HAVING ELECTROLUMINESCENT READOUT

INVENTORS
HAMILTON C. CHISHOLM
BY RICHARD F. HALL
Samuel B. Stone
ATTORNEY

Dec. 20, 1966 H. C. CHISHOLM ETAL 3,293,416

DATA CONVERSION FOR COUNTER HAVING ELECTROLUMINESCENT READOUT

Filed April 4, 1963 4 Sheets-Sheet 2

INVENTORS
HAMILTON C. CHISHOLM
BY RICHARD F. HALL

Samuel B. Stone
ATTORNEY

Dec. 20, 1966 H. C. CHISHOLM ETAL 3,293,416

DATA CONVERSION FOR COUNTER HAVING ELECTROLUMINESCENT READOUT

Filed April 4, 1963 4 Sheets-Sheet 3

*INVENTORS*
HAMILTON C. CHISHOLM
BY RICHARD F. HALL

Samuel B. Stone
ATTORNEY

INVENTORS
HAMILTON C. CHISHOLM
BY RICHARD F. HALL
Samuel B. Stone
ATTORNEY

United States Patent Office 3,293,416
Patented Dec. 20, 1966

3,293,416

DATA CONVERSION FOR COUNTER HAVING ELECTROLUMINESCENT READOUT

Hamilton C. Chisholm, Orinda, and Richard F. Hall, Pleasant Hill, Calif., assignors to Beckman Instruments, Inc., a corporation of California
Filed Apr. 4, 1963, Ser. No. 270,620
10 Claims. (Cl. 235—92)

This invention relates to readout arrangements for counters, and more particularly to solid state counters having electroluminescent readout devices and an arrangement for converting the output of the counter to a form suitable for operating the readout device.

Counters to which the present invention is applicable generally include a plurality of binary stages composed of flip-flops or binaries and which are interconnected to count input pulses applied to an input. Generally a counter includes a plurality of decades each of which may comprise four binary stages connected to produce ten discrete combinations of binary states. These stages usually incorporate vacuum tubes or transistors, thus affording only a small amount of power for energizing numerical readout devices. Accordingly, a typical type of display commonly utilized with counters comprises a plurality of neon lamps which are lighted one at a time to display the value of the number registered by the counter. A representative counter and readout similar to that just described is disclosed in Patent No. 2,843,320 of H. C. Chisholm entitled "Transistorized Indicating Decade Counter," and assigned to the assignee of the present invention.

An improved type of readout device frequently utilized today includes a segmented display which provides an arabic numeral type presentation. Typically the display includes seven segments. Neon or incandescent lamps may be utilized to individually illuminate the segments or the segments may comprise electroluminescent elements. Such devices offer a very convenient digit display of the digits zero through nine, and it is desirable to utilize them in decimal counters. However, difficulties have been encountered in obtaining a bright readout from low level binary stages and without overloading the binary stages. Additionally, the direct current output of the binary stages can not directly operate the electroluminescent readout devices which require an alternating current input.

One solution to the problems encountered with electroluminescent readout devices, is set forth in U.S. Patent 3,161,867 of Carl L. Isborn entitled, "Logic Systems," and assigned to the assignee of the present invention. Briefly, this application discloses a logic system comprising a plurality of light sources, a plurality of light sensitive elements such as photoconductors, and a plurality of light paths for selectively coupling the light sources to the sensitive elements. The light rays transmitted from the light sources are unilateral by nature and do not require the diodes used in conventional logic circuits. The light source and photoconductor combinations operate as switches, the photoconductor having a low resistance when activated and a high resistance when inactivated. Such a logic system converts from a first predetermined code in which each of the indicia is represented by a discrete input signal to a second predetermined code adopted for controlling the segmented display. The segments are normally energized by an appropriate power source, and the desired digits are then displayed by inhibiting or turning off the required segments. Appropriate inhibit connections are provided by connecting the plurality of photoconductors in parallel with respective readout segments. When activated, the photoconductor acts as an on switch and bypasses the current from its associated readout segment. An arrangement similar to that above is shown in FIG. 1 and will be discussed subsequently.

As noted above, the logical requirements are conversion of one code to another, the latter being compatible with the number of segments employed in a segmented readout device. Conversion must take place from low signal and power level inputs to current or voltage levels sufficient for operation of light sources, such as incandescent or neon lamps. Additionally, the conversion device preferably should be relatively simple and inexpensive to manufacture.

Accordingly, it is a feature of the present invention to provide an improved conversion arrangement for converting the output of a counter to a form suitable for operating the segments of a readout device in a simple and economical manner and without overloading the counter.

It is a further feature of the present invention to provide an improved arrangement for converting from a binary or binary coded decimal code to a code suitable for operating the segments of a readout device in a simple and economical manner.

In accordance with a specific illustration of the present invention a code conversion arrangement is interposed between a transistorized counter, or a buffer, and a segmented readout device. The conversion apparatus includes a plurality of appropriately interconnected transistor switches for switching the relatively high voltages or currents necessary to drive a plurality of logically related light sources. All but one of the light sources are grouped according to their control of pairs of displayed numerals. The remaining one of the light sources controls the selection of a particular displayed numeral. A first means controls the selection or de-selection of even-odd numerals; whereas, other means control selection of pairs of numerals. Specific examples of such conversion apparatus are illustrated utilizing either neon lamps or incandescent lamps. The particular arrangements illustrated provide the required high voltage or current switching capabilities in a reliable manner and without significantly loading the binary stages of the counter or interposed buffer.

Other features and objects of the invention will be better understood from a consideration of the following detailed description when read in conjunction with the attached drawings in which.

Figure 1:
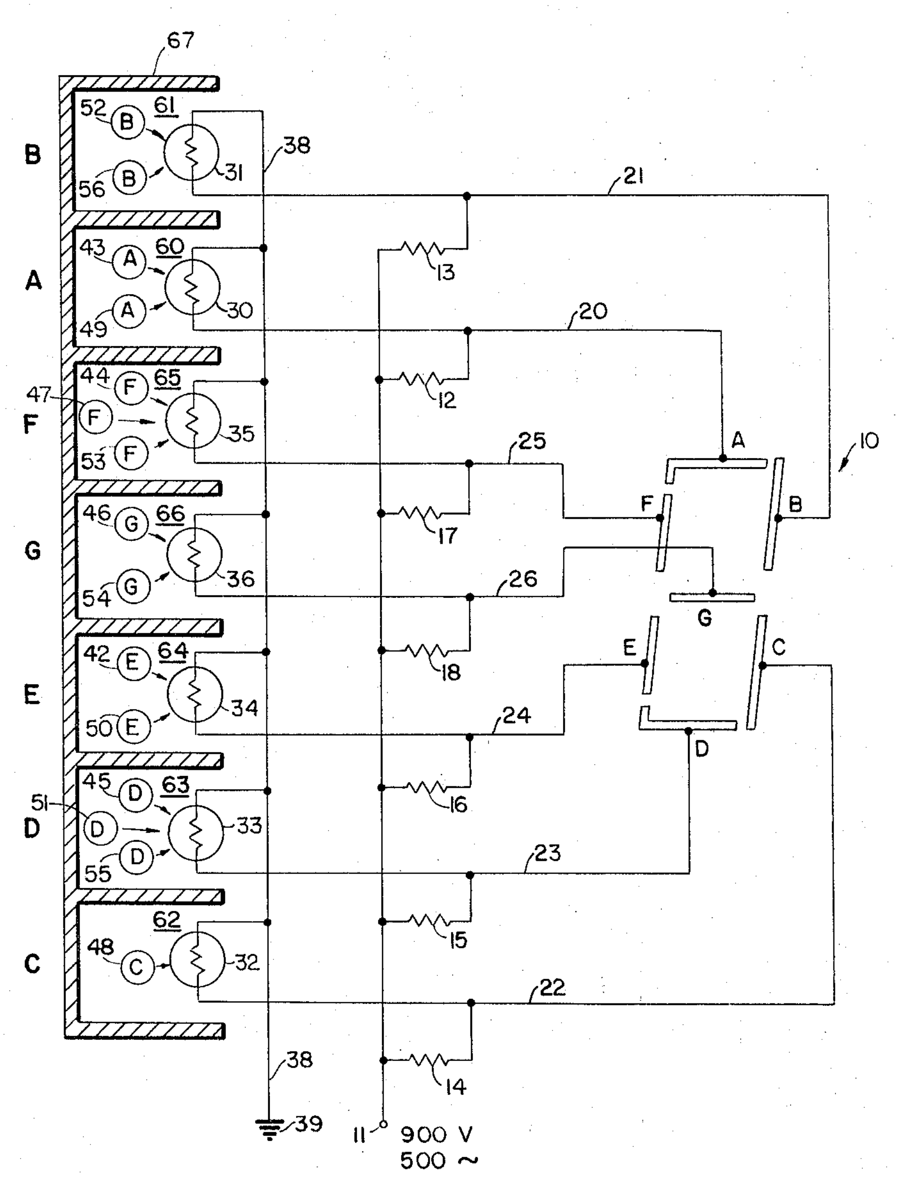
FIG. 1 is a diagrammatic illustration of a seven segment electroluminescent readout device and the manner in which it is controlled with photoresistors and light sources.

Referring now to FIG. 1, an illustrative control arrangement for a seven segment electroluminescent readout device generally indicated by the reference numeral 10 is shown. The electroluminescent readout device 10 includes the seven segments which are denoted by reference letters A, B, C, D, E, F and G. As will be explained in greater detail subsequently, during operation each of the segments is energized and will be lighted unless inhibited. Thus in normal operation the numeral "8" is displayed. In order to display a "1" the segments A, D, E, F and G are inhibited. A "2" is displayed by inhibiting the C and F segments. The numerals "3" through "7" and "9" are displayed in a similar manner.

A source of alternating current, for example 900 volts at 500 cycles, is connected to energize the segments of the electroluminescent readout device 10. The terminal 11 is connected through resistances 12 through 18 and respective lines 20 through 26 to the segments A through G, respectively. The lines 20 through 26 and resistors 12 through 18 also are connected to one terminal of respective photoresistors 30 through 36. The opposite terminal of each of the photoresistors 30 through 36 is connected to a line 38 which in turn is connected to ground 39. Normally the photoresistors 30 through 36 have a high resistance, and the voltage impressed on the terminal 11 is applied to the segments A through G. However, when sufficient light impinges upon one or more photoresistors, the resistance thereof decreases thereby providing a shunt path from the terminal 11 to ground 39. When a low resistance shunt path is thus provided, the light from the associated segment of the electroluminescent readout device 10 is extinguished. A plurality of lamps 42 through 56 are situated adjacent the photoresistors 30 through 36. These lamps may either be neon or incandescent as will be discussed subsequently. Either the lamp 43 or 49 when lighted causes photoconductor 30 to become a low resistance and inhibit the light output from segment A. Lamp 52 or 56 operates to inhibit segment B, and the remaining lamps operate to inhibit the segments C through G in a similar manner.

The photoresistors 30 through 36 and the lamps 42 through 56 are located in individual compartments 60 through 66 of a light tight box 67. Only a diagrammatic cross sectional view of the box 67 is illustrated. The box is arranged so that light from the B segment lamps 52 and 56 can impinge only on the photoresistor 31 and not on the remaining photoreistors, light from the A segment lamps 43 and 49 can impinge only on the photoresistor 30, etc.

Figure 2:
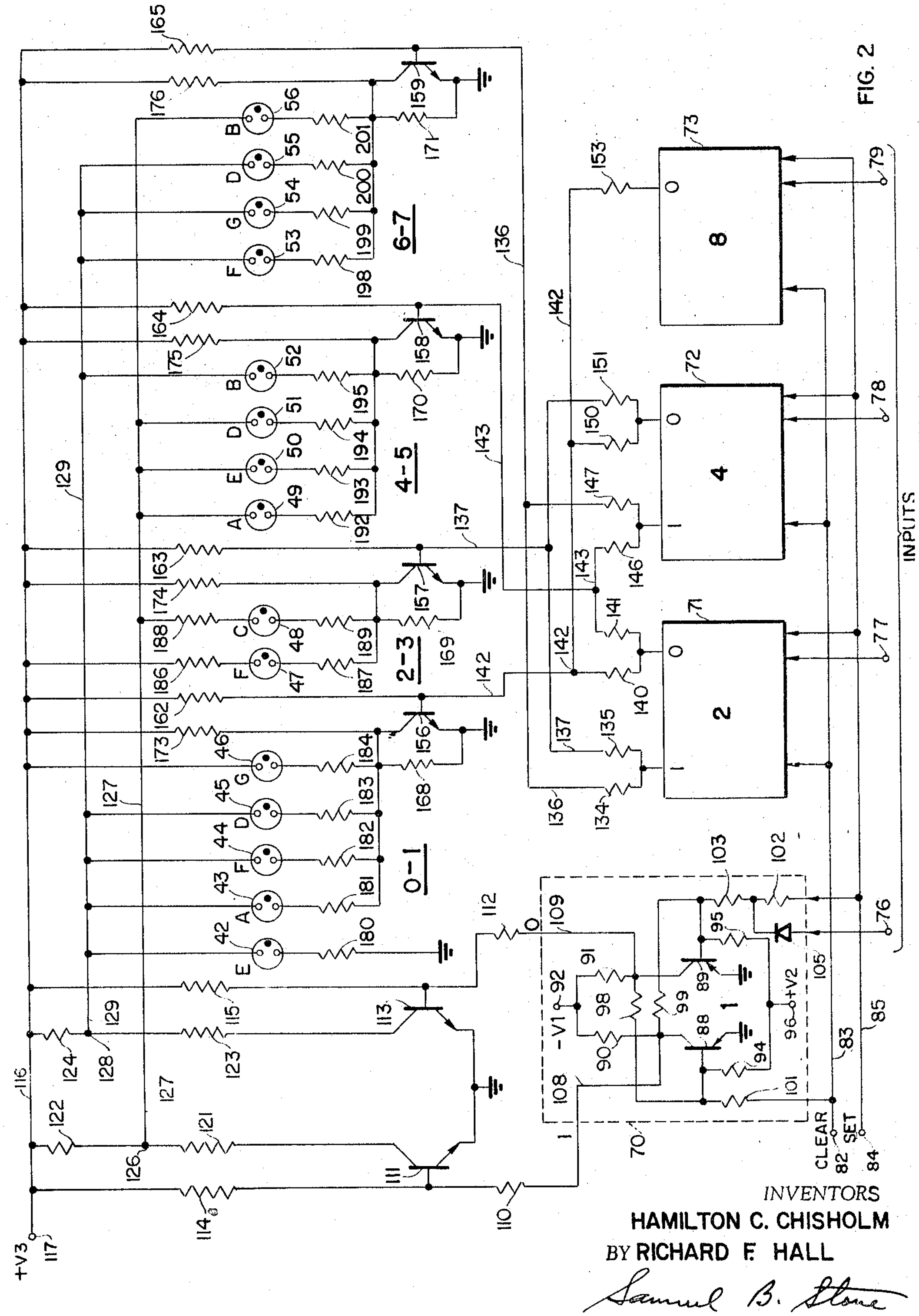
FIG. 2 is a preferred arrangement of a converter for converting from binary coded decimal to control the seven segments of the readout device shown in FIG. 1.

According to a feature of the present invention, the lamps 42 through 56 are controlled by means of a novel conversion circuit in order to selectively energize one or more of these lamps reliably without the need of amplification and without overloading the driving binary stages or the counter. FIG. 2 illustrates a preferred arrangement for operating neon bubs. A decade including four low voltage and low level flip-flops or binary stages 70 through 73 is illustrated. These binary stages may be the actual binary counting stages (interconnections for counting not illustrated) or they may be a buffer or storage arrangement located between the actual counter and the readout conversion circuit. A buffer storage arrangement is desirable where additional readout equipment, such as a printer, is employed. As shown, these binary stages 70 through 73 function as a buffer between a counter which may be connected to input terminals 76 through 79. A "clear" or "reset" terminal 82 is connected through a line 83 to each of the clear inputs of the flip-flops 70 through 73. In a similar manner, a "set" terminal 84 is connected through a line 85 to each of the set inputs of the flip-flops 70 through 73.

The flip-flop 70 is illustrated in detail, and includes a pair of PNP transistors 88 and 89. The emitters of the transistors 88 and 89 are grounded, and their collectors are connected through respective resistances 90 and 91 to a negative voltage terminal 92. A typical voltage —V1 connected to the terminal 92 is —15 volts. The bases of the transistors 88 and 89 are connected through respective resistances 94 and 95 to a positive voltage terminal 96. A typical voltage +B2 connected to the terminal 96 is +10 volts. The base of the transistor 88 is connected through a resistance 98 to the collector of the transistor 89, and the base of the transistor 89 is connected through a resistance 99 to the collector of the transistor 88.

The clear line 83 is connected through a resistance 101 to the base of the transistor 88. The set line 85 is connected through resistances 102 and 103 to the base of the transistor 89. The input terminal 76 is connected through a diode 105 to a junction 106 between the resistances 102 and 103. A negative signal applied to the base of either of the transistors 88 or 89 turns on the respective transistor. If the transistor 88 is "on" (low impedance between collector and emitter), the flip-flop 70 is said to be in the one state; whereas, if the transistor 89 is "on" the flip-flop is said to be in the zero state.

The one output of the flip-flop 70 is taken from the collector of the transistor 88 by means of a line 108, and the zero output is taken from the collector of the transistor 89 by means of a line 109. The line 108 is connected through a resistance 110 to the base of an NPN transistor 111. The line 109 is connected through a resistance 112 to the base of an NPN transistor 113. The bases of the transistors 111 and 113 are connected through respective resistances 114 and 115 to a positive voltage supply line 116 which in turn is connected to a positive voltage terminal 117. A typical voltage +V3 connected to the terminal 117 is around +110 volts. The emitters of the transistors 111 and 113 are connected to ground and the collectors thereof are connected through respective pairs of resistors 121 and 122, and 123 and 124 to the line 116.

The flip-flop 70 and the transistor switches 111 and 113 function to select and de-select odd and even numbers; whereas, the remaining flip-flops 71 through 73 function to select and de-select particular pairs of numbers. For example, the flip-flop 71 may select numbers zero and one and the flip-flop 70 select an odd or even number thereby providing the ultimate single number output. In this case, if the flip-flop 70 and transistor switches 111 and 113 select an odd number, a one will be selected.

A junction 126 between the resistors 121 and 122 is connected to a line 127, and a junction 128 between the resistances 123 and 124 is connected to a line 129. Thus, depending upon the condition of the transistor switches 111 and 113, the lines 127 and 129 will have a voltage approaching +V3 or ground. For example, if the transistor 111 is turned off (and thus the transistor 113 is turned on because of the output supplied by the flip-flop 70) the voltage on the line 127 is approximately +V3; whereas, the voltage on the line 129 is at a potential less than +V3 depending upon the voltage divider resistances 123 and 124. The opposite voltages exist on the lines 127 and 129 when the transistor 111 is on and the transistor 113 is off.

The outputs of the flip-flops 71 through 73 are connected with a resistive matrix. The one output of the flip-flop 71 is connected through resistances 134 and 135 to respective lines 136 and 137. The zero output of the flip-flop 71 is connected through resistances 140 and 141 to respective lines 142 and 143. The one output of the flip-flop 72 is connected through resistances 146 and 147 to the respective lines 143 and 136. The zero output of the flip-flop 72 is connected through resistances 150 and 151 to respective lines 142 and 137. The zero output of the flip-flop 73 is connected through a resistance 153 to the line 142.

The lines 142, 137, 143 and 136, which serve as the output of the resistive matrix, are connected to the bases of respective NPN transistors 156 through 159. The transistors 156 through 159 serve to select and de-select certain lamps in order to ultimately select and de-select pairs of numbers for display by the readout device. Thus, the transistor switch 156 selects the numeral pair zero and one, the transistor switch 157 selects the numeral group two and three, the transistor switch 158 selects the numeral pair four and five, and the transistor switch 159 selects the numeral group six and seven. An eight is selected if all lamps are "off." A single lamp 42 always controls segment E turning it off on every odd number. Thus, a nine is obtained when pair selector transistors 156 through 159 are inactive and when the lamp 42 is energized. The lamp 42 is controlled by the even-odd transistor switches 111 and 113. Note that the flip-flop 71 and 72 on zero and one counts are in the zero state and are also in that state on the eight and nine counts. The flip-flop 73 through the resistance 153 prevents the zero and one counts from being selected when an eight or nine is to be indicated. An eight or nine is then selected depending on the states of the flip-flops 111 and 113.

The bases of the transistor switches 156 through 159 are connected through respective resistances 162 through 165 to the line 116. Resistances 168 through 171 are connected across the collector-emitter paths of the respective transistors 156 through 159. The emitters of the transistors 156 through 159 are each grounded, and the collectors thereof are connected through respective resistances 173 through 176 to the line 116.

The A through G segment lamps 42 through 56 shown in FIG. 2 correspond to the similarly numbered and lettered lamps illustrated in FIG. 1. The upper terminal of the lamp 42 is connected to the line 129, and the lower terminal thereof is connected through a resistance 180 to ground. The upper terminals of the lamps 43 through 45 are connected to the line 129, and the lower terminals thereof are connected through respective resistances 181 through 183 to the collector of the transistor 156. The upper terminal of the lamp 46 is connected to the line 116, and the lower terminal thereof is connected through a resistance 184 to the collector of the transistor 56. The lamp 47 is connected through a resistance 186 to the line 116 and through a resistance 187 to the collector of the transistor 157. The lamp 48 is connected through a resistance 188 to the line 127, and through a resistance 189 to the collector of the transistor 157.

The lamps 49 through 52 are connected through respective resistances 192 through 195 to the collector of the transistor 158, with the upper terminals of the lamps 49 through 51 being connected to the line 127 and the upper terminal of the lamp 52 being connected to the line 129. The lower terminals of the lamps 53 through 56 are connected through respective resistances 198 through 201 to the collector of the transistor 159, and the upper terminals of the lamps 53 through 55 are connected to the line 129, and the upper terminal of the lamp 56 is connected to the line 127.

As noted previously, the outputs of the flip-flop stages 70 through 73 may be considered as the outputs of a buffer or as the outputs of the actual stages of a counter. The transistor switches 111 and 113 may be considered as an odd-even selector, with the transistor switches 156 through 159 being considered numerical pair selectors. The flip-flops 70 through 73 employ low voltage transistors, and the transistors 111, 113 and 156 through 159 are high voltage types. The resistances 134, 135, 140, 141, 146, 147, 150, 151 and 153 connected to the outputs of the flip-flops 71 through 73 may be considered as a resistive matrix. These resistors serve primarily to provide isolation and reduce interaction between the flip-flops. Diodes may be used in place of these resistances, but are not necessary. The resistances 180 through 184, 187, 189, 192 through 195 and 198 through 201 connected to the neon lamps are employed as current limiting resistances and prevent any one neon lamp from dominating (clamping) the other lamps when it ionizes.

The following is a truth table which illustrates the count to be decoded, the states of the flop-flop 70 through 73 and which lamps need be energized. It should be borne in mind that negative logic is employed, that is, a lamp is turned on which in turn causes a segment of the electroluminescent readout device to be extinguished in turn.

| Count | Flip-Flop States | | | | Bulbs on (Segments Off) | | | | | | |
|---|---|---|---|---|---|---|---|---|---|---|---|
| | 73 | 72 | 71 | 70 | A | B | C | D | E | F | G |
| 0 | 0 | 0 | 0 | 0 | ---- | ---- | ---- | ---- | ---- | ---- | X |
| 1 | 0 | 0 | 0 | 1 | X | ---- | ---- | X | X | X | X |
| 2 | 0 | 0 | 1 | 0 | ---- | ---- | X | ---- | ---- | X | ---- |
| 3 | 0 | 0 | 1 | 1 | ---- | ---- | ---- | ---- | X | X | ---- |
| 4 | 0 | 1 | 0 | 0 | X | ---- | ---- | X | X | ---- | ---- |
| 5 | 0 | 1 | 0 | 1 | ---- | X | ---- | ---- | X | ---- | ---- |
| 6 | 0 | 1 | 1 | 0 | ---- | X | ---- | ---- | ---- | ---- | ---- |
| 7 | 0 | 1 | 1 | 1 | ---- | ---- | ---- | X | X | X | X |
| 8 | 1 | 0 | 0 | 0 | ---- | ---- | ---- | ---- | ---- | ---- | ---- |
| 9 | 1 | 0 | 0 | 1 | ---- | ---- | ---- | ---- | X | ---- | ---- |

In order to provide a better understanding of the operation of the conversion arrangement illustrated in FIG. 2, the following examples are given. Assume that a count of two is to be read out. The flip-flops 70, 72 and 73 are in their zero states, and the flip-flop 71 is in its one state. Thus, the zero outputs of the flip-flops 70, 72 and 73 and the one output of the flip-flop 71 are substantially at ground. The one outputs of the flip-flops 70, 72 and 73, and the zero output of the flip-flop 71 are at a negative voltage. A positive voltage is applied to the base of the transistor 113, thereby turning on this transistor. A negative voltage is applied to the base of the transistor 111, and this transistor remains off. The voltage on the line 129 is less than that which will allow a neon to remain energized, and the line 127 is substantially at +V3 volts. It can be seen that the lines 136, 137, and 142 have ground potential impressed thereon from the one output of the flip-flop 71 and the zero outputs of the flip-flops 72 and 73. The lines 142, 143 and 136 have negative voltages impressed thereon from the zero output of the flip-flop 71 and the one output of the flip-flop 72. It should be noted that if any line has a negative voltage impressed thereon the transistor switches 156 through 159 connected with this line will not turn on. This is true even if a ground potential is impressed upon a line (along with the negative potential) because the resultant voltage on the line is some negative value and is not sufficiently positive to turn on the associated transistors 156 through 159. Thus, only a line with all ground potentials applied thereto is sufficiently positive to turn on one of the associated transistors 156 through 159. It will be apparent, in the present example, that the only line with no negative voltages impressed thereon is the line 137 which is connected to the base of the transistor 157. Hence, the transistor 157 is turned on. Both a negative voltage and a ground voltage are applied to the lines 136 and 142, and only negative voltages are applied to the line 143. Hence, the transistors 156, 158 and 159 are off.

Since the transistors 156, 158 and 159 are turned off, the associated lamps 43 through 46, 49 through 52, and 53 through 56 are off. Since the transistor 113 is on, and the line 129 is at a voltage which is less than that which will allow a neon lamp to remain on, the lamp 42 is off. Thus, the lamps for numerals 0–1, 4–5, 6–7 and 9 are de-selected. The F and C lamps 47 and 48, respectively, are on at this time. The line 127 is substantially at +V3 volts, and current may exist in the path defined by the terminal 117, the resistance 122, the terminal 126, the line 127, the resistance 188, the lamp 48, the resistance 189, and the collector-emitter path of the transistor 157 to ground. A current path exists through the lamp 47 from the terminal 117, the line 116, the resistance 186, the lamp 47, the resistance 187 and the collector-emitter path of the transistor 157 to ground. Hence, the lamps 47 and 48 are on and all other lamps are off. Referring back to FIG. 1, it can be seen that the rays from the F lamp 47 impinge upon the photoresistor 35, and the rays from the C lamp 48 impinge upon the photoresistor 32. Thus, the photoresistors 32 and 35 provide a shunt path for the voltage applied to the terminal 11 and the C and F segments of the electroluminescent readout device 10 are extinguished. Only the segments A, B, D, E and G remain energized thus displaying the numeral "2."

As another example assume that a count of three is to be displayed. In this case the one outputs of the flip-flops 70 and 71, and the zero outputs of the flip-flops 72 and 73 are at ground potential. The zero outputs of the flip-flops 70 and 71, and the one output of the flip-flop 72 are at a negative voltage. The transistor 111 is turned on and the transistor 113 is turned off. The line 127 is at a voltage which is less than that which will allow a neon lamp to remain on, and the line 129 is substantially at +V3 volts. Again, the only line having all positive or ground potentials applied thereto is the line 137 connected to the base of the transistor 157. Thus, the transistor 157 is on, and the F lamp 47 is on. However, the C lamp 48 which is connected to the line 127 is off since the line 127 is substantially at a voltage which is less than that which will allow a neon lamp to remain on, because the transistor 111 is on. Since the line 129 is substantially at +V3 volts, the E lamp 42 is on. All other lamps are off. Hence the E and F lamps are on thereby extinguishing the E and F segments of the electroluminescent device 10 in FIG. 1. It will be apparent that the lamps 42 through 56 are turned on in other combinations in order to extinguish other segments A through G of the electroluminescent readout device 10 to provide different numeral displays.

Figure 3:
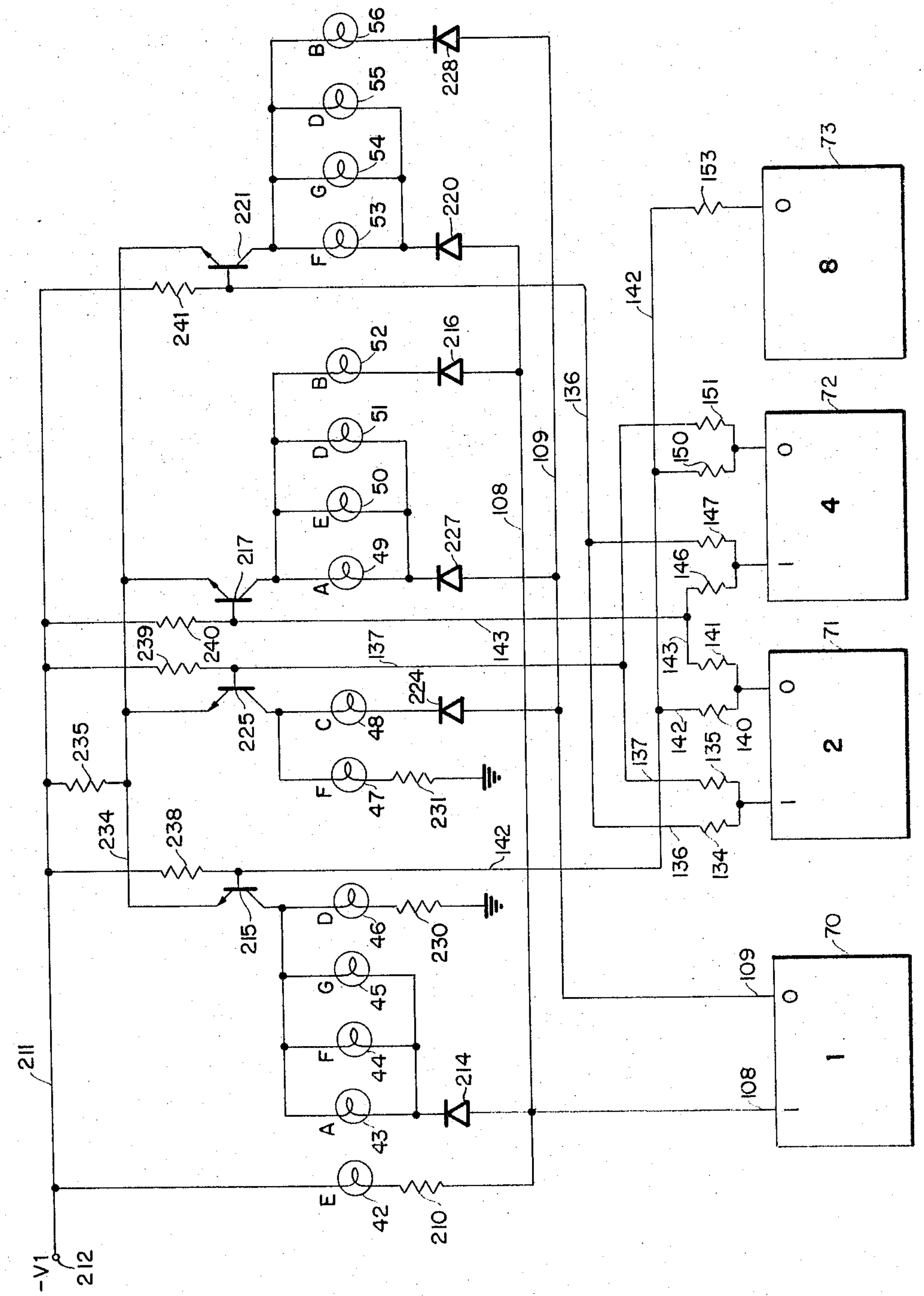
FIGS. 3 and 4 are alternative examples of converters in which incandescent lamps are utilized as the light sources.

FIG. 3 illustrates a conversion arrangement for operating incandescent lamps. For convenience of illustration the same reference numerals are used to designate like parts throughout the various figures. Additionally, the safe reference numerals 42 through 56 are used for the incandescent lamps shown in FIGS. 3 and 4 as were used for the neon lamps in FIG. 2. The primary difference between the use of neon or incandescent lamps resides in the voltage or current characteristics. The neon lamps operate faster but take a high voltage; whereas, the incandescent lamps operate slower but take a high current. Both type lamps consume approximately the same amount of power. An essentially parallel arrangement of lamps is employed, with the first flip-flop 70 controlling lamp current and the remaining flip-flops controlling base current of buffer transistor switches.

The flip-flops 70 through 73 shown in FIG. 3 are constructed and operated in the same manner as the flip-flops shown in FIG. 2. The one output line 108 of the flip-flop 70 is connected through a resistance 210 to the E lamp 42. The upper terminal of the lamp 42 is connected to a negative voltage supply line 211 which in turn is connected to a negative voltage terminal 212. The line 108 is connected through a diode 214 to the lamps 43 through 45. The opposite terminals of the lamps 43 through 45 are connected to the collector of the transistor 215. The line 108 also is connected through a diode 216 to the lamp 52, which in turn is connected to the collector of a transistor 217. The line 108 is connected through a diode 220 to the lamps 53 through 55, the opposite terminals of which are connected to the collector of a transistor 221.

The line 109 is connected through a diode 224 to the lamp 48, the upper terminal of which is connected to the collector of the transistor 225. The line 109 also is connected through a diode 227 to the lower terminals of the lamps 49 through 51. The upper terminals of the lamps 48 through 51 are connected to the collector of the transistor 217. Additionally, the line 109 is connected through a diode 228 to the lamp 56. The upper terminal of the lamp 56 is connected to the collector of the transistor 221.

The upper terminal of the lamp 46 is connected to the collector of the transistor 215, and the lower terminal thereof is connected through a resistance 230 to ground. In a similar manner, the upper terminal of the lamp 47 is connected to the collector of the transistor 225, with its lower terminal connected through a resistance 231 to ground. The emitters of the transistors 215, 217, 221 and 225 are connected together and to a line 234. The line 234 is connected through a resistance 235 to the negative voltage line 211.

The resistances 134, 135, 140, 141, 146, 147, 150, 151 and 153 connected with the outputs of the flip-flops 71 through 73 are interconnected with the lines 136, 137, 142 and 143 in the same manner as in FIG. 2. The line 142 is connected with the base of the transistor 215, and the base thereof is connected through a resistance 238 to the negative voltage line 211. The lines 137 and 143 are connected to the respective bases of the transistors 225 and 217, the bases thereof being connected through respective resistances 239 and 240 to the negative voltage line 211. The line 136 is connected to the base of transistor 221, and the base of this transistor is connected through a resistance 241 to the negative voltage line 211.

The table previously discussed also illustrates the operation of the converter arrangement shown in FIG. 3. Taking a count of seven, for example, the flip-flops 70 through 72 may be said to be their one states, and the flip-flop 73 in its zero state. Thus, the one outputs of the flip-flops 70 through 72 and the zero output of the flip-flop 73 are substantially at ground potential. The zero outputs of the flip-flops 70 through 72 are at a substantially negative voltage. A positive voltage appears on the line 108 and a negative voltage appears on the line 109. Of the lines 136, 137, 142 and 143 only the line 136 has all positive potentials applied thereto. Thus, the transistor 221 is turned on, and the transistors 215, 217 and 225 are turned off.

A conductive path exists from the negative voltage terminal 212 through the lamp 42, the resistance 210, and the line 108 to ground in the flip-flop 70. Also, a current path exists from the negative voltage terminal 212, the line 211, the resistance 235, the line 234, the emitter-collector path of the transistor 221, the lamps 53 through 55 in parallel, the diode 220, and the line 108 to ground in the flip-flop 70. Thus, only the lamps 42, 53, 54 and 55 are turned on which in turn extinguish the respective segments E, F, G and D of the electroluminescent readout device 10 shown in FIG. 1. Since only the segments A, B, and C remain energized, a "7" is displayed. As in FIG. 2, the arrangement shown in FIG. 4 allows low voltage level flip-flops to control buffer transistor switches which in turn drive the respective bulbs or lamps. The first flip-flop 70 must handle higher currents than the remaining flip-flops which need control only the base currents of the buffer transistors. It should be noted that the base current control matrix connected with the bases of the switching transistors 215, 217, 221 and 225 requires only resistors.

Figure 4:
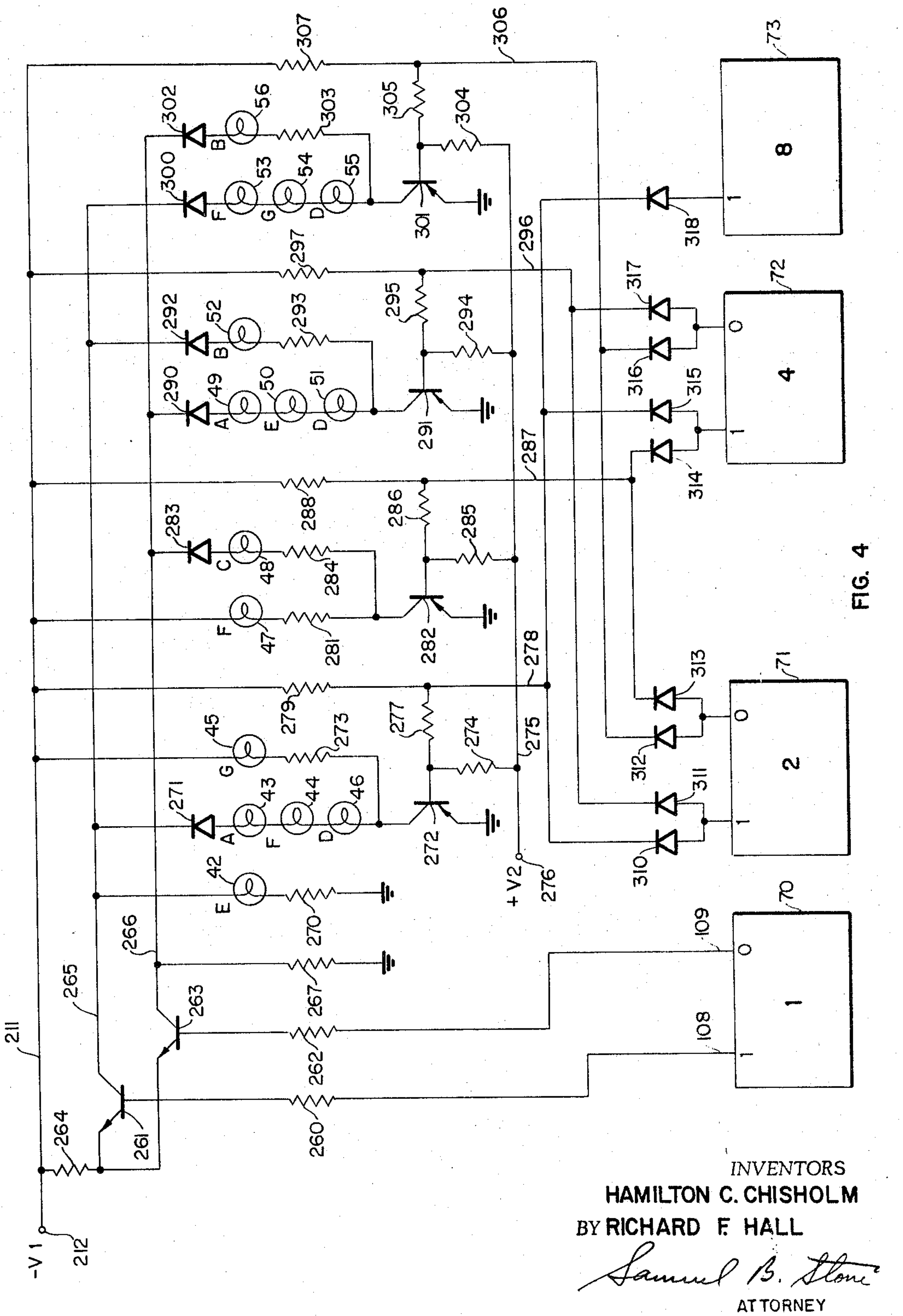

FIG. 4 illustrates an alternative arrangement for controlling incandescent lamps. In this arrangement, buffer transistors are used to control even-odd lines as well as in pair selection. The transistors used in the pair selection circuits may be more economical PNP type transistors. It also should be noted that the lamps shown in FIG. 4 are connected in series rather than in parallel as in FIG. 3. This parallel arrangement reduces the amount of load current greatly but at the expense of more voltage. However, the reduction of load current is an advantage, and can be applied to the arrangement shown in FIG. 3. In FIG. 4, a diode matrix is used to control the base currents of the buffer switching transistors instead of a resistive matrix as in FIG. 3. Again, like reference numerals are used to denote equivalent components which have been previously discussed.

The one line 108 from the flip-flop 70 is connected through a resistance 260 to the base of an NPN transistor 261. The zero line 109 is connected through a resistance 262 to the base of an NPN transistor 263. The emitters of the transistors 261 and 263 are connected together and through a resistance 264 to the negative voltage line 211. The collector of the transistor 261 is connected to a line 265, and the collector of the transistor 263 is connected to a line 266. The line 266 is connected through a resistance 267 to ground.

The upper terminal of the lamp 42 is connected to the line 265, and the lower terminal thereof is connected through a resistance 270 to ground. The lamps 43 through 46 are connected in series and through a diode 271 to the line 265. The lower terminal of the lamp 46 is connected to the collector of a PNP transistor 272. The lamp 45 is connected to the line 211, and through a resistance 273 to the collector of the transistor 272. The emitter of the transistor 272 is connected to ground, and the base thereof is connected through a resistance 274 to a positive bias voltage line 275 which in turn is connected to a positive voltage terminal 276. The base of the transistor 272 also is connected through a resistance 277 to a line 278, and through the resistance 277 and a resistance 279 to the line 211.

The upper terminal of the lamp 47 is connected to the line 211, and the lower terminal thereof is connected through a resistance 281 to the collector of a PNP transistor 282. The upper terminal of the lamp 48 is connected through a diode 283 to the line 266, and the lower terminal thereof is connected through a resistance 284 to the collector of the transistor 282. The emitter of the transistor 282 is grounded, and the base thereof is connected through a resistance 285 to the line 275. The base of the transistor 282 also is connected through a resistance 286 to a line 287, and through the resistance 286 and a resistance 288 to the line 211.

The lamps 49 through 51 are connected in series, with the upper terminal thereof being connected through a diode 290 to the line 266, and the lower terminal thereof connected to the collector of a PNP transistor 291. The lamp 52 is connected through a diode 292 to the line 265, and through a resistance 293 to the collector of the transistor 291. The emitter of the transistor 291 is connected to ground, and the base thereof is connected through a resistance 294 to the line 275. The base of the transistor 291 also is connected through a resistance 295 to a line 296 and through a resistance 297 to the line 211.

The lamps 53 through 55 are connected in series and through a diode 300 to the line 265. The lower terminal of the lamp 55 is connected to the collector of a transistor 301. The lamp 56 is connected through a diode 302 to the line 266, and through a resistance 303 to the collector of the transistor 301. The emitter of the transistor 301 is grounded, and the base thereof is connected through a resistance 304 to the line 275. The base of the transistor 301 also is connected through a resistance 305 to a line 306, and through the resistance 305 and a resistance 307 to the line 211.

The one output of the flip-flop 71 is connected through a diode 310 to the line 278, and through a diode 311 to the line 296. The zero output of the flip-flop 71 is connected through a diode 312 to the line 306, and through a diode 313 to the line 287. The one output of the flip-flop 72 is connected through a diode 314 to the line 287, and through a diode 315 to the line 278. The zero output of the flip-flop 72 is connected through a diode 316 to the line 306, and through a diode 317 to the line 296. The one output of the flip-flop 73 is connected through a diode 318 to the line 278.

The conversion arrangement illustrated in FIG. 4 operates similar to those previously discussed and illustrated in FIGS. 2 and 3. The table previously set forth is equally applicable to the arrangement shown in FIG. 4. For example, assume that a count of five is to be displayed. The one outputs of the flip-flops 70 and 72, and the zero output of the flip-flop 71 are substantially at ground potential. The zero outputs of the flip-flops 70 and 72, and the one outputs of the flip-flops 71 and 73 are at a negative voltage. Since a substantially positive voltage is applied to the base of the transistor 261, this transistor is turned on. The transistor 263 is off because a negative voltage is applied to its base. Only the line 296 which is connected through the resistance 295 to the base of the PNP transistor 291 has all negative voltages applied thereto. Since a PNP transistor turns on when a negative voltage is applied to its base, the transistor 291 turns on. The lines 278, 287 and 306 have one or more positive voltages (ground) applied thereto, and the transistors 272, 282, and 301 connected therewith are turned off. Thus, a current path exists from the negative voltage terminal 212 through the resistance 264, the emitter-collector path of the transistor 261, the line 265, the lamp 42, and the resistance 270 to ground. A similar path exists from the terminal 212, through the resistance 264, the emitter-collector path of the transistor 261, the line 265, the diode 292, the lamp 52, the resistance 293, and the collector-emitter path of the transistor 291 to ground. Since the transistor 263 is turned off, the line 266 is substantially at ground potential because it is connected through the resistance 267 to ground. Thus the lamps 49 through 51 which are connected to the line 266 do not turn on. The remaining lamps likewise do not turn on because their associated buffer transistors 272, 282 and 301 are turned off. Hence, only the E lamp 42 and the B lamp 52 are turned on which in turn extinguish the E and B segments of the electroluminescent readout device 10 shown in FIG. 1. The A, C, D, F and G segments remain energized and display the numeral "5."

It now should be apparent that the present invention provides an improved conversion arrangement for converting the output of a counter to a form suitable for operating the segments of a readout device in a simple and economical manner. The specific arrangements illustrated as exemplary include both conversion arrangements for operating neon lamps as well as incandescent lamps. The concepts embodied in the present invention provide the desired operating features without significantly overloading the counter circuit. The control lamps are arranged in groups, and certain of these lamps are controlled directly by buffer transistors which handle the necessary voltage or currents involved. One binary input to the conversion arrangement essentially controls odd-even selection; whereas, certain of the remaining binary inputs control the selection of groups of lamps arranged to control the selection or de-selection of pairs of numerals to be displayed.

It will be understood that although exemplary embodiments of circuits constructed in accordance with the teachings of the present invention have been disclosed and discussed, other applications and circuit arrangements are possible and that the embodiments disclosed may be subjected to various changes, modifications and substitutions without necessarily departing from the spirit of the invention.

What is claimed is:

1. A counter and readout device therefor comprising a plurality of binary stages each of which provides one or more discrete outputs, a readout device including a segmented display and control means coupled therewith for controlling the operation of the readout device, a plurality of lamps arranged to operate said control means, terminal means for connecting said lamps to a source of voltage, the improvement comprising at least certain of said lamps being arranged in groups for controlling the selection of pairs of numbers to be displayed by said readout device, a pair of control transistors, means coupling said control transistors with one of said binary stages, said terminal means and certain of said lamps for controlling the selection of even or odd numbers to be displayed by said readout device, a control matrix coupled with at least one of the outputs of the remaining binary stages, and a plurality of buffer transistor switches corresponding to the number of said groups individually connected with said groups of lamps and said matrix for selective control of said groups of lamps in accordance with signals supplied by said matrix to cause the selection of a pair of numbers for display by said readout device, whereby a single number is displayed by said readout device.

2. A conversion and visual display arrangement for a counter including a plurality of inputs in a binary coded form indicative of the number of signals received by a counter, a readout device including a segmented numerical display for displaying arabic numeral representations of the number of signals received by said counter, a control means coupled with said readout device and including a plurality of lamps for inhibiting the energization of selected segments of said display, a terminal for connection to a voltage source and connected with said control means, the improvement comprising means connected with a first pair of said inputs, said control means and said voltage source for controlling whether an odd or an even number will be displayed by said segments, a plurality of switching transistors coupled with said control means for selecting which one of a group of odd-even pairs of numerals will be displayed, and matrix means coupled with certain of the remaining inputs and with said switching transistors to cause one of said switching transistors to select one of said pairs of odd-even numerals whereby a single numeral is displayed.

3. An arrangement as in claim 2 wherein said means connected with said first pair of inputs includes a pair of control transistors.

4. An arrangement as in claim 2 wherein said lamps are neon lamps.

5. A conversion and visual display arrangement for a counter including a plurality of input terminals for receiving input signals in a coded form indicative of the number of counts registered by said counter, a readout device including a plurality of electroluminescent segments arranged for displaying arabic numerals indicative of the number of counts registered by said counter, a control means coupled with said segments and including a plurality of lamps for inhibiting the energization of selected segments, the improvement comprising buffer storage means connected with said input terminals, said buffer storage means including a plurality of bistable devices, first switching means connected with a first of said bistable devices and with certain of said lamps for controlling the selection of even or odd numbers to be displayed by said segments, a matrix coupled with at least one of the outputs of the remaining bistable devices, at least certain of said lamps being arranged in groups for controlling the selection of pairs of numbers to be displayed by said segments, and a control switching means coupled with each of said groups of lamps and said matrix for selecting a predetermined group of lamps in response to a predetermined signal from said matrix, whereby said first switching means selects the display of odd or even numbers, and said control switching means selects a single pair of numerals including one odd number and one even number so that a single numeral is displayed by said segments.

6. A conversion and control arrangement for the visual display of a counter including a plurality of input terminals for receiving input signals in a coded form indicative of the number of counts registered by said counter, a control means including a plurality of lamps which are adapted for inhibiting the energization of selected segments of a segmented visual display readout device, the improvement comprising first switching means connected with at least a first of said input terminals and with certain of said lamps for controlling the energization thereof to select or de-select lamps which will control the selection of even or odd numbers to be displayed by said segments, a matrix coupled with the remaining input terminals, at least certain of said lamps being arranged in groups for controlling the selection of pairs of numbers to be displayed by said segments, and a control switching means coupled with each of said groups of lamps and said matrix for selecting a predetermined group of lamps in response to a predetermined signal from said matrix, whereby said first switching means selects the display of odd or even numbers, and said control switching means selects a single pair of numerals including one odd number and one even number so that a single numeral may be displayed by said segments.

7. A conversion and control arrangement as in claim 6 including buffer storage means connected with said input terminals, said first switching means and said matrix, said buffer storage means including a plurality of bistable devices.

8. A conversion and visual display arrangement for a counter including a plurality of input terminals for receiving input signals in a coded form indicative of the number of counts registered by said counter, a readout device including a plurality of electroluminescent segments arranged for displaying arabic numerals indicative of the number of counts registered by said counter, a control means coupled with said segments and including a plurality of lamps for inhibiting the energization of selected segments, the improvement comprising first switching means connected with at least a first of said input terminals and with certain of said lamps for controlling the selection of even or odd numbers to be displayed by said segments, a matrix coupled with the remaining input terminals, at least certain of said lamps being arranged in groups for controlling the selection of pairs of numbers to be displayed by said segments, and a control switching means coupled with each of said groups of lamps and said matrix for selecting a predetermined group of lamps in response to a predetermined signal from said matrix, whereby said first switching means selects the display of odd or even numbers, and said control switching means selects a single pair of numerals including one odd number and one even number so that a single numeral is displayed.

9. A conversion and visual display arrangement for a counter including a plurality of input terminals for receiving input signals in a coded form indicative of data registered by said counter, a readout device including a plurality of electroluminescent segments arranged for displaying indicia which is representative of the data registered in said counter, a control means coupled with said segments and including a plurality of devices which emit radiant energy for inhibiting the energization of selected segments, the improvement comprising first switching means connected with at least a first input terminal and with certain of said devices for controlling the selection of first or second indicia to be displayed by said segments, a matrix coupled with the remaining inputs, at least certain of said devices being arranged in groups for controlling the selection of pairs of indicia to be displayed by said segments, and a control switching means coupled with each of said groups of devices and said matrix for selecting a predetermined group of devices in response to a predetermined signal from said matrix, whereby said first switching means selects the display of first or second indicia, and said control switching means selects a single pair of indicia including at least one first and second indicia so that a single indicia is displayed by said segments.

10. A conversion and control arrangement for the visual display of a counter including a plurality of input terminals for receiving input signals in a coded form indicative of data registered by said counter, a control means including a plurality of devices which emit radiant energy and which are adapted for inhibiting the energization of selected segments of a segmented visual display readout device, the improvement comprising first switching means connected with at least a first of said input terminals and with certain of said devices for controlling the energization thereof to select or de-select devices which will control the selection of first or second indicia to be displayed by said segments, a matrix coupled with the remaining input terminals, at least certain of said devices being arranged in groups for controlling the selection of pairs of indicia to be displayed by said segments, and a control switching means coupled with each of said groups of devices and said matrix for selecting a predetermined group of devices in response to a predetermined signal from said matrix, whereby said first switching means selects the display of first or second indicia, and said control switching means selects a single pair of indicia including at least one first and second indicia so that a single indicia may be displayed by said segments.

References Cited by the Examiner

UNITED STATES PATENTS

| | | | |
|---|---|---|---|
| 2,950,418 | 8/1960 | Reis | 315—169 |
| 3,010,651 | 11/1961 | Hempel | 235—92 |
| 3,062,441 | 11/1962 | Martin | 235—92 |
| 3,141,093 | 8/1964 | Soloman | 250—213 |
| 3,146,436 | 8/1964 | Crow | 340—336 |
| 3,204,234 | 8/1965 | Nakauchi | 340—336 |

DARYL W. COOK, *Acting Primary Examiner.*

J. F. MILLER, *Assistant Examiner.*